United States Patent
Zwaal

(10) Patent No.: US 9,218,363 B2
(45) Date of Patent: Dec. 22, 2015

(54) SYSTEM AND METHOD FOR MAINTAINING LOCATION INFORMATION IN A DATABASE

(75) Inventor: Frederik Hugo Zwaal, Breda (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 18 days.

(21) Appl. No.: 14/359,453

(22) PCT Filed: Nov. 24, 2011

(86) PCT No.: PCT/EP2011/070924
§ 371 (c)(1),
(2), (4) Date: Jul. 29, 2014

(87) PCT Pub. No.: WO2013/075748
PCT Pub. Date: May 30, 2013

(65) Prior Publication Data
US 2014/0357307 A1    Dec. 4, 2014

(51) Int. Cl.
*H04W 24/00* (2009.01)
*G06F 17/30* (2006.01)
*H04W 64/00* (2009.01)
*H04W 4/04* (2009.01)
*H04L 29/06* (2006.01)
*H04W 4/02* (2009.01)
*H04W 8/00* (2009.01)

(52) U.S. Cl.
CPC .......... *G06F 17/30241* (2013.01); *H04L 67/42* (2013.01); *H04W 4/02* (2013.01); *H04W 4/043* (2013.01); *H04W 8/005* (2013.01); *H04W 64/003* (2013.01)

(58) Field of Classification Search
CPC ..... H04L 67/18; H04W 64/00; H04W 64/003
USPC ......................................................... 455/457
See application file for complete search history.

(56) References Cited

U.S. PATENT DOCUMENTS

| 7,246,746 | B2 | 7/2007 | McNamara et al. |
| 7,698,377 | B2 * | 4/2010 | Parekh et al. ................. 709/217 |
| 2002/0184418 | A1 | 12/2002 | Blight |
| 2006/0115123 | A1 * | 6/2006 | Kanai et al. ................... 382/104 |
| 2006/0229058 | A1 * | 10/2006 | Rosenberg ................. 455/404.2 |
| 2011/0148624 | A1 | 6/2011 | Eaton et al. |

FOREIGN PATENT DOCUMENTS

| EP | 1587249 A1 | 10/2005 |
| EP | 1843524 A1 | 10/2007 |

* cited by examiner

*Primary Examiner* — Thomas Lett
(74) *Attorney, Agent, or Firm* — Murphy, Bilak & Homiller, PLLC

(57) ABSTRACT

The invention relates to a method for maintaining location information in a database. An application running in a client device scans for stationary devices that have a unique identifier. If such a device is found, the location of the device by means of the unique identifier is looked up from a central server comprising a database. If the unique identifier is in the database the physical location of the stationary device could be retrieved. As the stationary device is in the vicinity of the stationary device, the physical location of the user using the stationary device is known. If the unique identifier of the stationary device is not found, the user is asked once to identify its location. The unique identifier and location is then stored in the data structure of the database. Subsequent requests by a client device for the same stationary device will result in a known location.

15 Claims, 4 Drawing Sheets

SYSTEM AND METHOD FOR MAINTAINING LOCATION INFORMATION IN A DATABASE

TECHNICAL FIELD

The invention relates to a method and device for maintaining location information for a client device in a database.

BACKGROUND

Flexible workplaces are becoming more and more popular. They are cost effective and fit very well with new ways of working. Employees are no longer working at their office every day. By use of network connections, they could work at home or other places on a computer with the same data as if they work at their office.

By using document management systems, paper documents are made available electronically. This reduces the necessity to have a fixed workplace in an office further.

In a flexible workspace or environment, employees no longer have their own desk, but use a desk from a pool of desks. Consequently, they're not using the same desk each day. In most cases, a desk typically contains a docking station, and peripheral devices such as computer screen, keyboard, mouse or tablet electronically coupled to the docking station. An employee connects his or her own laptop to the docking station and establishes a connection to a server.

A flexible working environment exhibits at least two problems, especially if the environment is extensive, contains dividers or is spread over different locations. Firstly, it is difficult to locate colleagues, as they're sitting in different places each day. The best option to obtain their locations is to ask them where they are by phone, chat or email. However, this disturbs them. Secondly, it is difficult to find a suitable workplace that is free, especially in the vicinity of direct colleagues or a team. The best option to find a workplace is to walk around, looking for one or the team. However, this could take a considerable amount of time.

Some computer programs, for identifying a person's location in a flexible working environment provide an option to input one's location manually, so that it can be consulted by others. However, this requires every time a manual action that is error-prone. Furthermore, the action is easily forgotten.

U.S. Pat. No. 7,246,746 discloses an enterprise network for tracking objects. A networked system of ID readers tracks selected objects, such as people, office equipment, and office furniture. The distributed system of readers communicates in real-time with a centralized management/security system. The physical location of an object is characterized as being somewhere within the range of a reader. The physical location of each reader has to be stored in a database to know the physical location of the object. A dedicated and complex networked system is needed to track objects.

SUMMARY

It is an object of the invention to provide an improved method for maintaining location information of at least one device in a database, more particularly, a method in a client device for maintaining location information of stationary devices in a database and a method in a server for maintaining location information of stationary devices in a database.

According to a first aspect of the invention, there is provided a method in a client. The client scans for at least one device provided with a Unique IDentifier (UID) and having a fixed location and located near the client device and retrieves said unique identifier from the at least one device. The client device requests a server to obtain from the database location data corresponding to said unique identifier. If the database has no location data corresponding to said unique identifier, the client device receives a corresponding message. In response to said message, the client device requests a user using the client device to input location data corresponding to the location of the client device. The client devices receives the location data inputted by the user and instructs the server to generate in the database a device record corresponding to the at least one device, the device record comprising a UID-field and a location information field, wherein the unique identifier is stored in the UID-field and the location data is stored in the location information field.

According to a second aspect, there is provided a method in a server. The server receives and executes a request from the client device to obtain from the database location data corresponding to a unique identifier, wherein the unique identifier is part of the request. If the database has no location data corresponding to the unique identifier the server supplies to the client device a message indicating that the database has no location data corresponding to the unique identifier. The server receives and executes a first instruction comprising the unique identifier of a device and location data linked to said device from the client device to generate in the database a device record associated with the device. A device record comprising a UID-field and a location information field, wherein the unique identifier corresponding to the device is stored in the UID-field and location data corresponding to the device is stored in the location information field.

The methods are based on the concept that a client on which a user is working is coupled to a stationary device, for example a monitor. The stationary device comprises a Unique IDentifier (UID). Furthermore each stationary device has a physical location which does normally not change due to the nature of the device. If the unique identifier and corresponding physical location is stored in a database, the client, normally a laptop a user is working on, could obtain its physical location by obtaining from the remote database the physical location of the stationary device by the UID of the stationary device without user interaction. However, if the physical location of the stationary device could not be obtained from the database, a user is asked once to identify the corresponding location after which the UID and the corresponding location is stored in the database so that subsequent requests for the same stationary device result in a known physical location. Thus, when the same or another user subsequently couples his laptop to said stationary device, the location will be known and the user is not asked again to identify the user's location. The method uses the existing client/server network to maintain location information of both stationary devices and users of the network with minimal user interaction. A soon as the unique identifier of a stationary device and corresponding physical location is stored in the remote database, the physical location of the user using the client could be determined by retrieving the physical location of the stationary device from the database and assigning a corresponding location to the user in the remote database. This could be done by a small application that runs as a background process in an employee's laptop that communicates with an associated process that runs in a server.

In an embodiment, the database further comprises user records. A user record comprises a user ID-field and a location information field. The method in the client further comprises the action instructing the central server to update in the database a location information field of a user record of the user with the location data retrieved. The method in the server further comprises the action receiving from the client device and executing a second instruction comprising data identifying a user using the client device and location data linked to said user to update a location information field of a user record of said user in the database with the location data linked to said user. These features enable the method to update the location information of users.

In an embodiment, the client further detects a connection loss with the stationary device and instructs the server to update in the database the location information field of a user record of the user to reflect the connection loss. These features improve the accuracy of the location information associated with a user in the remote database. For example, if a user detaches his laptop from the docking station, the laptop could still be connected to the server by a wireless connection. As soon as the connection between stationary device and laptop is lost, the physical location of the laptop is unknown as the laptop could be moved to another location without losing connection with the server. By sending an instruction corresponding to the connection loss to the central server, the location information of the user is updated accordingly in the database.

In an embodiment, the client determines new status data for the user from user activity on the client device and instructs the server to update a status field of the user record of the user in the database with the status data determined in the determining action. These features further improve the location information of a user. By storing information about the user activity on the client, other users obtain information indicating the likelihood that the user is at the physical location or not. For example, if a user actively uses the client, it is very likely that he is near the location of the stationary device. However, if the client isn't used for more than 15 minutes, it is very likely that the user is not at his desk and thus somewhere else.

In an embodiment, the device is an external display unit electrically coupled to the client device and the unique identifier has been retrieved from extended display identification data stored in the external display unit. It has been found that digital displays comprise extended display identification data. Extended display identification data (EDID) is a data structure provided by a digital display to describe its capabilities to a video source. The EDID includes manufacturer name and serial number, product type, phosphor or filter type, timings supported by the display, display size, luminance data and (for digital displays only) pixel mapping data. This information uniquely identifies a digital display. A digital display is practically always a standard equipment of a flexible workplace in an office environment. This makes the EDID very useful to identify uniquely a location in a working environment.

In an embodiment, a server further detects a loss of connection with the client device; and subsequently updates in the database a status field of a user record of a user using the client device to indicate that the user is offline. These features improve the accuracy of the location information further.

A third aspect provides a client device comprising a processor and a memory to store instructions that, when executed by the processor, cause the client device to perform the method in a client according to the first aspect.

A fourth aspect provides a server comprising a processor and a memory to store instructions that, when executed by the processor, cause the central server to perform the method in a server according to the second aspect.

A fifth aspect provides a system for maintaining location information. The system comprises a plurality of client devices according to the third aspect, a plurality of stationary devices, a central server according to the fourth aspect and a webserver.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DETAILED DESCRIPTION

Figure 1:
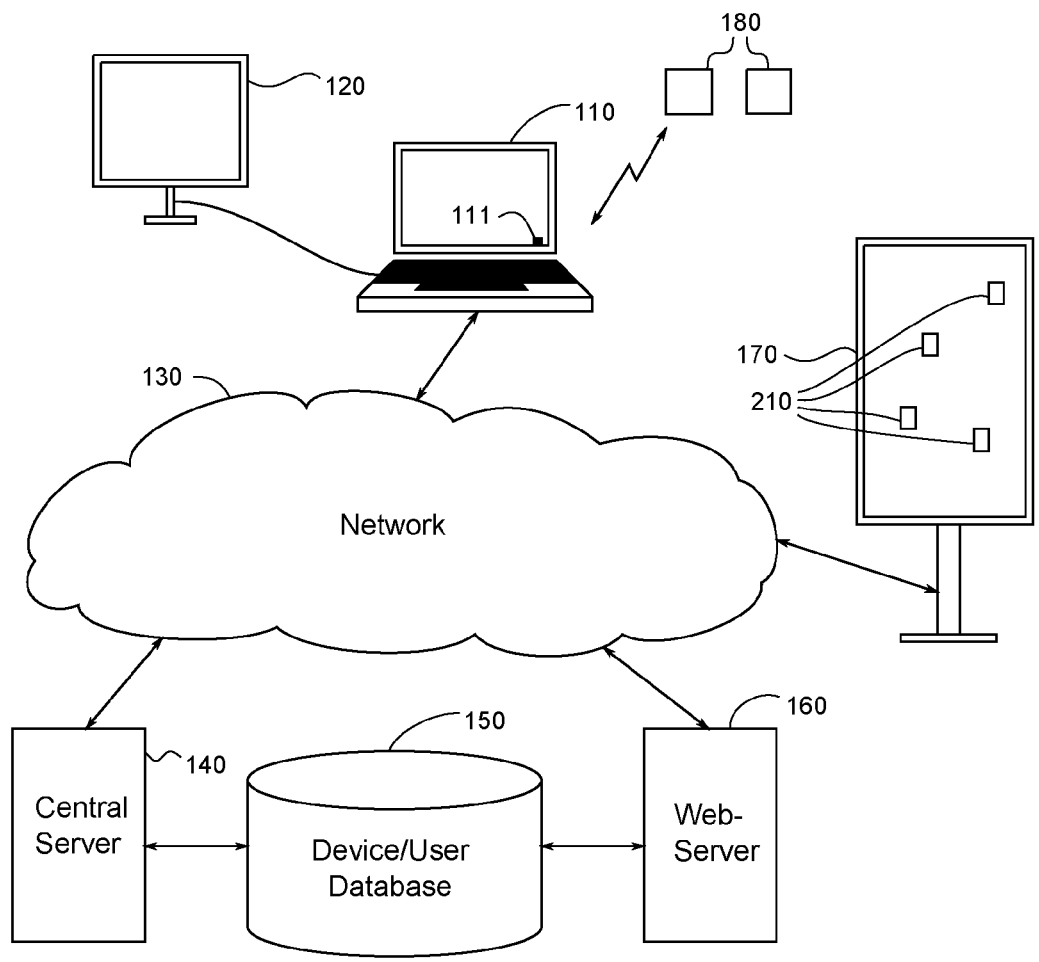
FIG. 1 shows schematically a system for maintaining location information.

FIG. 1 shows schematically a system for maintaining location information. The system comprises a plurality of client devices, only one client device 110 is shown in FIG. 1. Each client device 110 communicates via a network 130 with a central server 140. The communication over the network 130 could be via cables, wireless or a combination of cables and wireless. The central server 140 has access to a database 150 to store and retrieve information from the database 150. The system further comprises a webserver 160. The webserver 160 delivers web pages on request to clients 110,170. The system could comprise a client 170 in the form of an external display unit which is provided with a web browser. The display could be a touchscreen to enable users to control the external display unit. However other types of input means could be used, such as a keyboard. The external display unit could also be voice controlled by a voice controller.

The client device 110 is in an embodiment in the form of a laptop. The system comprises further a plurality of stationary devices. A stationary device is configured to communicate with a client device 110. FIG. 1 shows a stationary device in the form of a display monitor 120. A stationary device is a device which has over its lifetime a substantially fixed physical location and which comprises a unique identifier (UID) to identify uniquely the device, wherein the unique identifier could be communicated to the client device. In other words, a stationary device is a device whose physical location is fixed and which is not intended to be moved regularly from one place to another. In the present application "stationary" has the same meaning as "fixed". An example of a stationary device is a digital display monitor 120. A monitor is intended to be positioned on a desk once where the monitor will stay until it will be removed at the end of its lifetime. Another example of a stationary device is a ZigBee device 180 in a building automation system to control for example the light in a space. A Universal Serial Bus (USB)-device secured to a desk and comprising a unique identifier is a further exemplary example of a stationary device. If the client device is provided with a RFID-receiver, a RFID tag or near field communication (NFC) device could be used as stationary device 180 if it is attached to a desk and a unique identifier is stored in the device 180.

The unique identifier of a stationary device 120, 180 is digitally stored in the device and could be retrieved on request by a client device 110. Most digital displays 120 comprise Extended display identification data (EDID) stored in a memory of the digital display. EDID is a data structure provided by a digital display to describe its capabilities to a video source (e.g. graphics card or set-top box). It is what enables a modern personal computer to know what kinds of monitors are connected to it. EDID is defined by a standard published by the Video Electronics Standards Association (VESA). The EDID includes manufacturer name and serial number, product type, phosphor or filter type, timings supported by the display, display size, luminance data and (for digital displays only) pixel mapping data. DisplayID is a standard targeted to replace EDID and Enhanced EDID (E-EDID) extensions with a uniform format suited for both PC monitor and consumer electronics devices. The Extended display identification data uniquely describes a digital display. This enables the use of the EDID as a good base for locating a laptop when it is coupled to a digital display monitor 120. The digital display monitor could be coupled directly to a video port of the laptop 110 or via a docking station (not shown). Zigbee devices also have a unique identifier by means of their media access control (MAC) address.

The basic concept is that a small application is running as a background process in an employee's laptop 110. The application scans for peripheral devices, i.e. stationary devices 120, 180, that have a unique identifier. If such a device is found, the location of the device is looked up from a central server 140 comprising a database 150. The database comprises a stationary device database comprising a data structure, for example a device record, which links the unique identifier of a stationary device to data describing the physical location of the stationary device. If the unique identifier is in the database the physical location of the stationary device could be retrieved from the database. As the stationary device 120 is in the vicinity of the employee's laptop 110, the physical location of the user using the laptop is known. If the unique identifier of the stationary device 120 is not found in the stationary device database, the user is asked once to identify its location. The unique identifier and location is then stored in the data structure of the database 150. Subsequent requests by a client device for the same stationary device will result in a known location.

The back ground application is running on each client device 110. The application periodically scans for connected stationary devices with a unique identifier. A stationary device could be a peripheral device. The most common device satisfying this requirement is the computer monitor 120 which contains an Extended Display Identifier. Since the computer monitor 120 is fixed to a workplace, it provides a good base for locating the laptop 110 and consequently the user using said laptop.

Whenever a unique identifier is found, the application running on the client device 110 requests a linked location for the unique identifier from a central server 140 via the network 130. The central server 140 consults a database with the location of all known stationary devices. If a location corresponding to the unique identifier could be obtained from the database 150, the location of the client device is known and consequently the location of the user or users working on the client device is known and made available to a user database.

If the unique identifier cannot be found in the database, the user is requested to input his location. Any type of suitable human interface could be used to input a location. Examples of a human interface are a keyboard or a voice controller. The location could also be inputted by the user by pinpointing his or her location on a map shown on a touchscreen. This location is thereafter stored in the database, so that it can be used for all future users when their laptop is connected to the stationary device having the unique identifier.

The background application can also be used to find the location of co-workers. A user can simply ask a webserver 160 for the location of a co-worker, which is subsequently shown on a map if it is known. The location of a user is automatically known, when the user is connected to the central server and the client the user is working on is connected to a stationary device having a unique identifier which location information is made available in the database. By using a tray icon or other graphical presentation 111 for the background application, a user can see that the application is running. By selecting the tray icon, a user can change the application to foreground to activate the web browser part of the application.

The webserver can also construct on request of a web browser a map of a particular area containing all users that are currently located in the particular area. This map is based on user records in the database. In an embodiment, the map contains all desks and their occupants if any. This makes it easy to find a free desk in the vicinity of co-workers or team-members. In FIG. 1 the web browser is integrated in an information kiosk 170 with touchscreen. The information kiosk periodically requests the web server to generate a map of a particular area and displays the map on the screen. In the map, icons 210 of the users are displayed to indicate their location in the particular area of the working environment. The location of the icon on the map for a particular user corresponds to the location data linked with said particular user in the database.

The web browser could also be running on the client device 110. The client device by means of the web browser requests the webserver 160 in response to input of a user to construct a map of a particular area containing all users that are currently located in an area based on user records in the database 150. The webserver constructs the map and supplier the map to the client device. The client device receives the map and generates signals to display the map on a display unit. The display unit could be the monitor integrated in the client device or a monitor coupled to the client device. The monitor coupled to the client device could be the stationary device which unique identifier defines the location of the client device. In an embodiment, the client device is further configured to request the webserver 160 in response to input of a user to provide the client device with status information of a particular user from the database (150). The status information comprises at least location data of said particular user and a map of an area comprising a location corresponding to the location data. By means of the map, the user, requesting the status information of said particular user, could easily see where the particular user could be found in the working environment.

Figure 2:
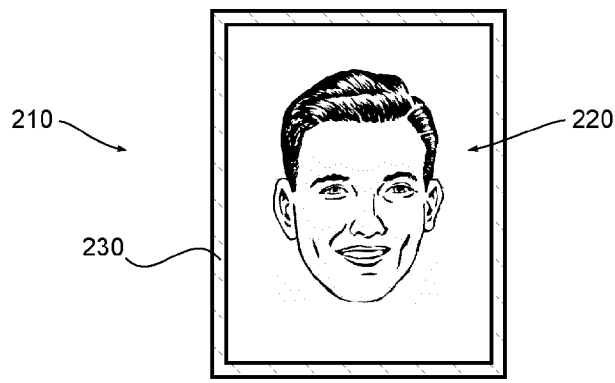
FIG. 2 shows an embodiment of representing information of a user on a display device.

FIG. 2 shows an enlarged view of an icon 210 of a user representing information of a user. The icon comprises a picture 220 of the user. A border 230 around the picture 220 could be used to indicate the status of a user. For example a green coloured border could indicate an active state, a yellow coloured border could indicate an idle state, a red coloured border could indicate "a don't disturb" state and a black border could indicate that the user is off-line. The active state means that the user is actively using input devices of the client device and thus sitting at the location indicated on the screen. The application running on the client device could use mouse movements and keystrokes to determine the activity of the user. By applying statistics on the user inputs, the application characterizes the user activity. The idle state means that the user is still logged on to the network but has not used the keyboard or another of the client device longer than a pre-defined period of time, for example 3 minutes. This is an indication that there is a likelihood that the user is near the indicated location in the working environment. The 'Don't disturb' state indicates that the user does not want to be disturbed, regardless of his location. The user could be active on the client device, or could be momentarily idle, or could be away from the client device. A user has to select this state in the application running in the client device via the user interface. As a result the application will supply an instruction to the central server to change content of status-data linked with said user accordingly. The Off-line state could include the location in the working environment where a user has been connected to the network for the last time. By clicking on the icon 210, some additional details of the user are displayed on the screen, such as his mobile phone number, email address, job title or current activities.

The system and method described before largely removes the need for employees to input their location into some system in order to allow them to be found. This saves them time and ensures that the location of all employees present is known. Other employees can therefore find their colleagues in a working environment without calling or emailing them first. The system and method further improves finding a suitable workplace, by presenting a map containing up to date information of all occupied workplaces, including a photo of the employee that is using a workplace. An arriving employee can simply find a suitable workplace by looking at the map for a free desk in the vicinity of his or her co-workers. Furthermore, visitors can use the information kiosk to easily find the location of an employee.

Figure 3:
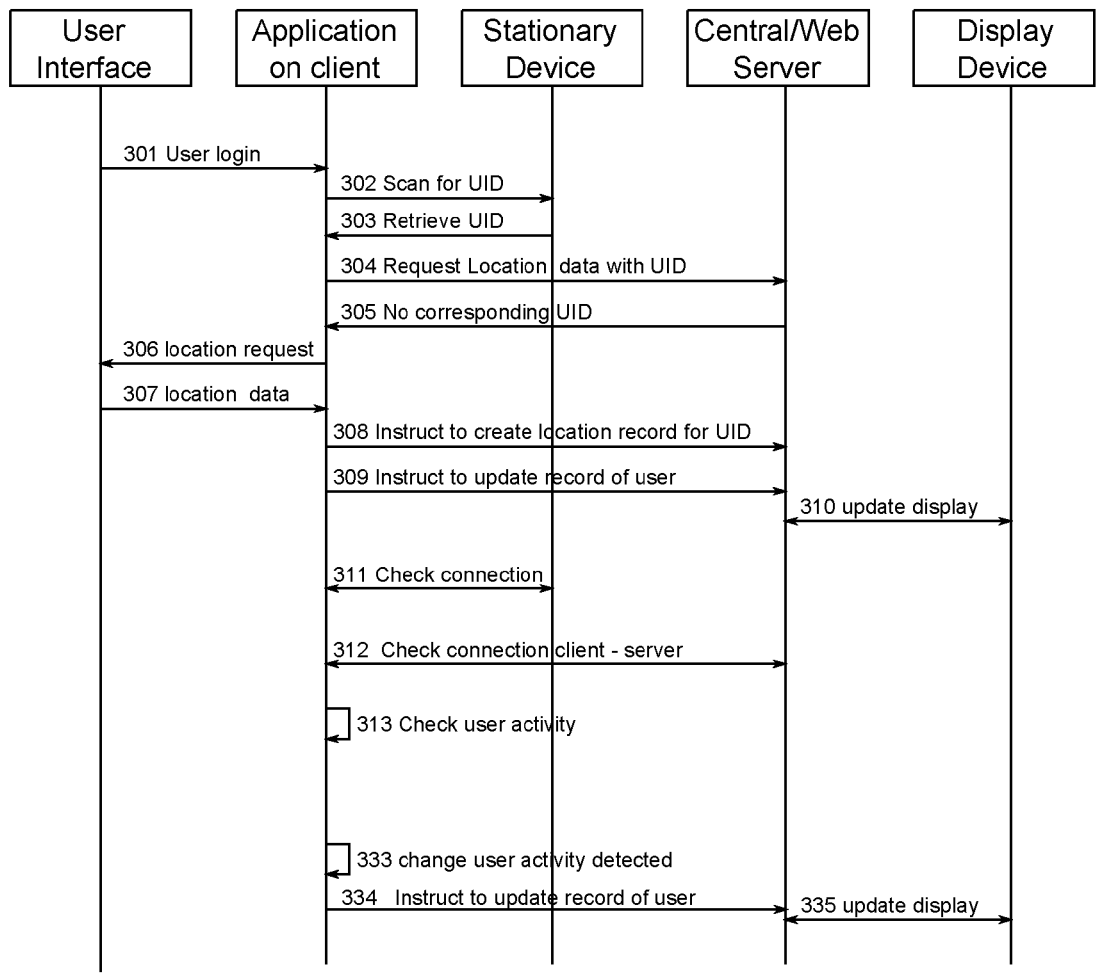
FIG. 3 shows a signalling diagram illustrating a first example of communication between the respective parts of the system shown in FIG. 1.

FIG. 3 shows a signalling diagram illustrating a first example of communication between the respective parts of the system shown in FIG. 1, wherein a user logs on to the system and his client device is connected to a stationary device which does not have a device record in the database. In action 301, a user login activates the application running on the client device 110. At login, for said user a connection will be established between the client device 110 and a central server 140. Subsequently, in action 302, the application scans for at least one stationary device 120, 180 in vicinity of the client device which is provided with a unique identifier (UID) and having a fixed location. In action 303 the application retrieves a unique identifier from one of the stationary devices 120, 180 in vicinity of the client device 110. In action, the application transmits a message to a central server 140 to request the central server to obtain from a database 150 coupled to the central server location data corresponding to the unique identifier retrieved in action 303. The database comprises a data structure which links a unique identifier of stationary device with a physical location. A physical location could be a desk in an office environment. The data structure could be in the form of stationary device records, each comprising a UID-field and a location information field, wherein the unique identifier of a stationary device is stored in the UID-field and the physical location associated with the stationary device is stored in the location information field. The central server 140 receives the message from the client device 110 with the request to obtain location data corresponding to a unique identifier from the database. The central server 140 queries the database 150 for the data structure comprising the unique identifier and retrieves the location data linked with the unique identifier from the database. The location data is subsequently submitted to the client device. In FIG. 3, the action for submitting location data linked to the unique identifier to the client device has reference numeral 320 and 330.

In the signalling diagram of FIG. 3, it is assumed that the unique identifier of the stationary device could not be found in the database and thus no location data could be obtained from the database. As a result on the request in action 304, in action 305 the central server supplies a message indicating that the database has no location data corresponding to said unique identifier. In alternative embodiment, the message indicates that a device record with data in the UID-field similar to the unique identifier of the stationary device could not be found in the database. The client device 110 receives this message. In response to this message, the application performs action 306 and requests via a user interface a user using the client device to input location data corresponding to the physical location of the client device 110, which is in principle the same location as the user in a working environment. The user interface could be key-controlled, voice-controlled or touchscreen-controlled. In action 307, the user supplies the location data to the application in the client device 110 and the client devices receives the location data inputted by the user.

After receipt of the location data, in action 308, the application in the client device supplies a message to the central server 140 to instruct the central server to generate in the database a data structure which comprises a link between the unique identifier retrieved in action 303 and the location data retrieved in action 307. The data structure in the database could be in the form of a stationary device record comprising a UID-field and a location information field, wherein the unique identifier is stored in the UID-field and the location data is stored in the location information field. The stationary device records together form a device database. The central server receives the message in the form of a first instruction which comprises both the unique identifier and the location data and executes the instruction by generating in the database the requested link between unique identifier and location data.

As the database also comprises a user database with a data structure which links a user to a location, in action 309 the application in the client device supplies a message to the central server 140 to instruct the central server to update in the database the data structure which comprises a link between the user and the location data retrieve in action 307. The data structure in the user database could be in the form of a user record comprising a user ID-field for storing data identifying a user and a location information field for storing data identifying a location. The user database comprises for each user a user record. The central server receives the message in the form of a second instruction which comprises both data identifying the user and the location data and executes the instruction by updating in the database the requested link between the user and location data. An action similar to action 309 is performed every time when location data has been obtained from the user (action 307) or from the database (action 320 and 330). It should be noted that actions 308 and 309 could be executed in any order.

The data structure describing the link between user and location is used by a webserver to generate a map to be displayed on a screen. In an embodiment, a map contains all desks in a particular area of an office and their occupants if applicable. In action 310 a display device comprising a web browser 170, for example an information kiosk, requests the webserver 160 to generate a map of a particular area and receives the map to display the map on the display. In the case of an information kiosk, action 310 is performed regularly, for example every minute or upon user interaction immediately after an instruction of a user.

The actions 311 and 312 are performed regularly for example each 10 seconds after the procedure described above has been executed. The repetition rate for action 311 and 312 could be different. In action 311 it is checked whether the client device could still establish a connection with the stationary device 120, 180. If this is not the case, this could an indication that the user working on the stationary device has moved to another location. The actions to be performed after a connection loss with the stationary device will be described hereafter. In action 312, the connection between the client device and the central server is checked. Methods to check the connection between a client device and a central server are commonly known to those skilled in the art and will thus not described in further detail. If the connection is lost, this is an indication that the client device 110 could be moved to another location or an indication that the user logged off from the client device 110. From said moment of connection loss the location of the user is unknown. This should be indicated in the database. The actions to be performed after a connection loss between client device and central server will be described hereafter.

The application running on the client device is further configured the maintain status information of a user in the database. Action 313 is a continuous process performed by monitoring the activity of the user on the client device. In an embodiment the mouse movements and/or keystrokes over a predetermined period are analysed and used to determine whether the user is actively using the client device or not using the client device. In action 333 the application determines new status data for the user by the detection of a change in user activity of the user on the client device. Subsequently in action 334 the client device sends a message to the central server to instruct the central server to update a status field of the user record of the user in the database with the status data determined in action 333. In action 335 the updated status field is communicated to the display device.

Monitoring the activity of a user and storing corresponding in the database improves the location information of a user. By storing information in the database about the user activity on the client, other users could obtain information indicating the likelihood that the user is at the physical location or not. For example, if a user actively uses the client, it is very likely that he is near the location of the stationary device. However, if the client isn't used for more than 15 minutes, it is very likely that the user is not at his desk and thus somewhere else.

Figure 4:
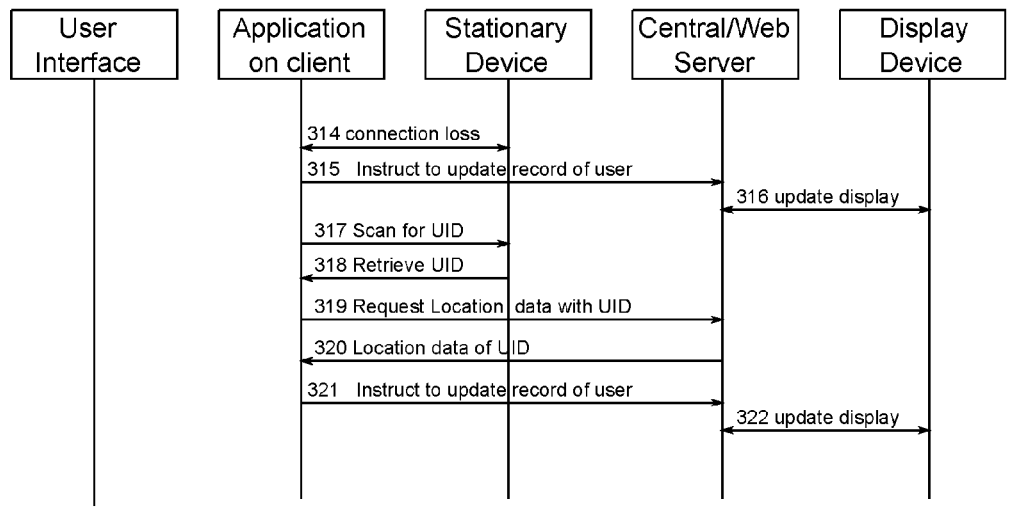
FIG. 4 shows a signal diagram illustrating a second example of communication between respective parts of the system.

FIG. 4 shows a signalling diagram illustrating a second example of communication between the respective parts of the system shown in FIG. 1, when the connection between a client device and stationary device is lost. Action 314 corresponds to the detection of a connection loss with the stationary device. In action 315, the application sends a message to the central server to update in the database user information of a user record associated with the user using the client device to reflect the connection loss with the stationary device. This could be done by updating a user information field of said user record. In action 316 the updated user information is communicated to the display device. After detection of a connection loss in action 314, the application starts the same actions after a user login, scanning for a stationary device provided with a unique identifier in the vicinity of the client device (action 317). If such a stationary device is found, retrieving the unique identifier from the stationary device (action 318). Requesting a central server to obtain from the database location data corresponding to said unique identifier (action 319).

If a data structure for the unique identifier exist in the database, receiving the location data supplied by the central server (action 320). Instructing the central server to update in the database a location information field of a user record of the user with the location data retrieved (action 321). This instruction implies that a new connection with a stationary device is established and the data indicating the connection loss is updated accordingly. In action 322 the updated location information is communicated to the display device. The addition of combination of detection of connection loss and actions 315, 317-321 to the method according to FIG. 3 improves the accuracy of the location information associated with a user in the database.

Figure 5:
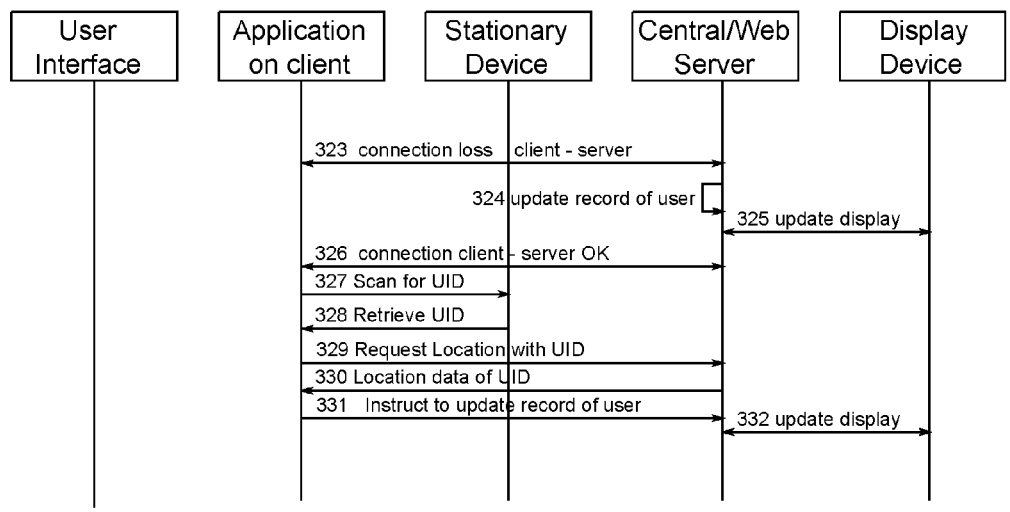
FIG. 5 shows a signal diagram illustrating a third example of communication between respective parts of the system.

FIG. 5 shows a signalling diagram illustrating a third example of communication between the respective parts of the system shown in FIG. 1, when the connection between a client device and central server is lost. Action 323 corresponds to the detection of a connection loss between client device and central server. Both the client device 110 and central server 140 will detect a connection loss and the application running on both the client device 110 and central server 140 will perform actions on said connection loss. In action 324 the central server 140 updates the location information in the user record associated with the user whose connection was lost to indicate that he is off-line. Optionally, status data and/or the time of the connection loss could be stored in the data structure associated with user whose connection was lost. The addition of actions 323 and 324 to the method according to FIG. 3 improves the accuracy of the location information associated with a user in the database. In action 325 the updated location information is communicated to the display device.

As soon as the connection between the client device 110 and the central server 140 is rebuilt (action 326), the application starts the same sequence of actions after a user login. Thus, scanning for a stationary device provided with a unique identifier in the vicinity of the client device (action 327). If such a stationary device is found, retrieving the unique identifier from the stationary device (action 328). Requesting a central server to obtain from the database location data corresponding to said unique identifier (action 329). If a data structure for the unique identifier exist in the database, receiving the location data supplied by the central server (action 330). Instructing the central server to update in the database a location information field of a user record of the user with the location data retrieved in action 330 (action 331). In action 332 the updated location information is communicated to the display device.

When a user logs off, the central server 140 detects a connection loss with the client device the user is working on and the central server updates the data in the status field of the user record associated with the user whose connection was lost to indicate that he is off-line. These actions correspond to the actions 323 and 324 described above.

Figure 6:
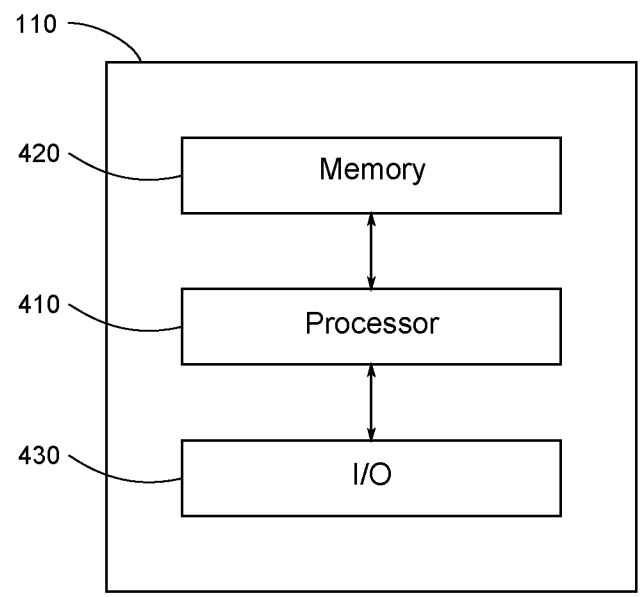
FIG. 6 shows a block diagram of a client device.

Referring to FIG. 6, there is illustrated a block diagram of exemplary components of a client device 110. The client device can be a PC, a laptop, a netbook PC, a tablet PC, a smart phone etc. As illustrated in FIG. 6, the client device 110 comprises a processor 410, a memory 420 and an I/O unit 430. The memory 420 is configured to store instructions that, when executed by the processor 410 cause the device 110 to perform the actions described before. The I/O unit 430 is configured to support all communications with the user, stationary devices, central server and web server and includes at least user interface means, communication ports and graphics processor.

Figure 7:
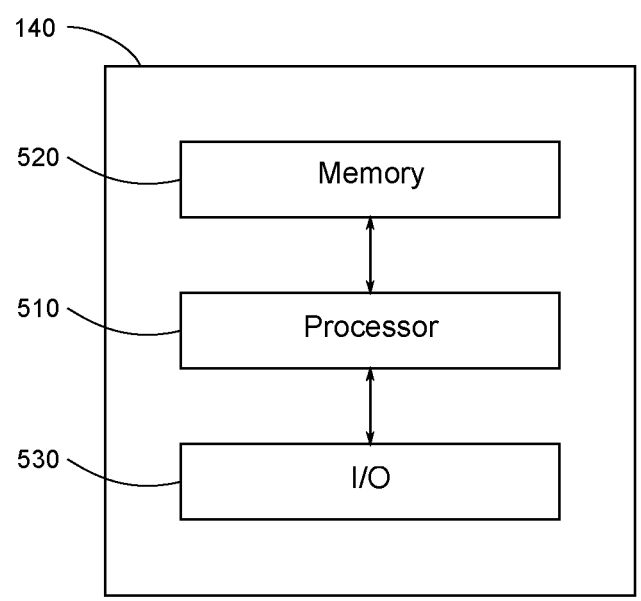
FIG. 7 shows a block diagram of a central server.

Referring to FIG. 7, there is illustrated a block diagram of exemplary components of a central server 140. As illustrated in FIG. 7, the central server 140 comprises a processor 510, a memory 520 and an I/O unit 430. The memory 520 is configured to store instructions that, when executed by the processor 510 cause the central server 140 to perform the actions in a central server described before. The I/O unit 430 is configured to support all communications with the database and client device.

In the embodiment described above the client device 110 uses the unique identifier of only one stationary device 120. However, when using for example ZigBee devices built into a building indicated by reference number 180 in FIG. 1, the client device 110 could retrieve more than one unique identifier from a stationary device in its neighbourhood. It might further be possible that more than one client device retrieves the same unique identifier from the same stationary device. In that case, the application running in the client device could comprise an algorithm which determines the physical location of the client and thus the user from the signals retrieved from the stationary devices and the locations linked with the unique identifiers of said stationary devices.

In the description given above, the client device 110 is an employee's laptop. However, it could be any other mobile device such as a netbook PC, a tablet PC and even a smart phone. A characteristic is that the device should be able to communicate with a stationary device to obtain the unique identifier from the stationary device.

It should further be noted, that the small application could also run on a desktop computer. This has the advantage that with the same application the physical location of users working on said desktop computer is also updated and known in the system.

Another advantage of the method and system in the present application is that they use an existing client/server network to maintain location information of both stationary devices and users of the network. Furthermore there is minimal user interaction needed to keep the location information in the database up to date. The location information corresponding to a new stationary device has to be inputted by a user once. A further advantage is that the system and method provides accurate, real-time desk usage. The location information in the database enables for performing statistics on the usage of a location. This information could be used to plan maintenance in said location. Furthermore, by automatic location detection of a user by means of the unique identifier of a stationary device to which his client device is connected, a user cannot forget to indicate where he is seated and when he leaves his seat. Furthermore, the systems allows a user to indicate that he should not disturbed by others. This improves his concentration on his job and consequently his working efficiency or productivity.

The present invention and its exemplary embodiment can be realized in many ways. For example, one embodiment includes a computer-readable medium or a computer program product having computer readable code stored thereon that are executable by a processor of a client device and/or server to cause the client device and/or server to perform the method of the exemplary embodiments as previously described.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the idea of the invention.

The invention claimed is:

1. A method, in a client device for maintaining location information of at least one device in a database, the method comprising:
    scanning for the at least one device, the at least one device being provided with a unique identifier (UID) and having a fixed location near the client device;
    retrieving said unique identifier from the at least one device;
    requesting a server to obtain from the database location data corresponding to said unique identifier (UID);
    receiving from the server a message indicating that the database has no location data corresponding to said unique identifier;
    requesting, if the database has no location data corresponding to said unique identifier a user, using the client device, to input location data corresponding to the location of the client device;
    receiving the location data inputted by the user; and,
    instructing the server to generate in the database a device record, corresponding to the at least one device, the device record comprising a UID-field and a location information field, wherein the unique identifier (UID) is stored in the UID-field and the location data is stored in the location information field.

2. The method of claim 1, wherein the database further comprises for each user a user record, the user record comprising a user ID-field and a location information field, and wherein the method further comprises instructing the server to update in the database a location information field of a user record of the user with the location data retrieved.

3. The method of claim 1, wherein the method further comprises:
    detecting a connection loss with the device;
    instructing the server to update in the database an information field of a user record of the user to reflect the connection loss.

4. The method of claim 1, wherein the method further comprises:
    detecting a network connection loss with the server;
    detecting a new network connection with the server; and
    after detecting the new connection:
        scanning for the at least one device;
        retrieving said unique identifier from the at least one device;
        requesting a server to obtain from the database location data corresponding to said unique identifier (UID);
        receiving from the server a message indicating that the database has no location data corresponding to said unique identifier;
        requesting, if the database has no location data corresponding to said unique identifier a user, using the client device, to input location data corresponding to the location of the client device;
        receiving the location data inputted by the user; and,
        instructing the server to generate in the database a device record, corresponding to the at least one device, the device record comprising a UID-field and a location information field, wherein the unique identifier (UID) is stored in the UID-field and the location data is stored in the location information field;
    wherein the database further comprises for each user a user record, the user record comprising a user ID-field and a location information field, and wherein the method further comprises instructing the server to update in the database a location information field of a user record of the user with the location data retrieved.

5. The method of claim 1, wherein the method further comprises:
   determining new status data for the user from user activity on the client device; and
   instructing the central server to update a status field of the user record of the user in the database with the status data determined in the determining action.

6. The method of claim 1, wherein the device is an external display unit electrically coupled to the client device and the unique identifier (UID) has been retrieved from extended display identification data stored in the external display unit.

7. A method, in a server, for maintaining location information in a database, wherein the server is configured to communicate with a client device, the method comprising:
   receiving and executing a request from the client device to obtain from the database location data corresponding to a unique identifier (UID), wherein the unique identifier is part of the request;
   if the database has no location data corresponding to the unique identifier supplying to the client device a message indicating that the database has no location data corresponding to the unique identifier;
   receiving and executing a first instruction comprising the unique identifier (UID) of a device and location data linked to said device from the client device to generate in the database a device record corresponding to the at least one device, the record comprising a UID-field and a location information field, wherein the unique identifier (UID) is stored in the UID-field and location data is stored in the location information field.

8. The method of claim 7, wherein the method further comprises:
   receiving from the client device and executing a second instruction comprising data identifying a user using the client device and location data linked to said user to update a location information field of a user record of said user in the database with the location data linked to said user.

9. The method of claim 7, wherein the method further comprises:
   detecting a loss of connection with the client device; and subsequently
   updating in the database a status field of a user record of a user using the client device to indicate that the user is offline.

10. A non-transitory computer-readable medium comprising, stored thereupon, computer-readable code that, when executed on a processor of a client device, causes the client device to:
    scan for at least one device, the at least one device being provided with a unique identifier (UID) and having a fixed location near the client device;
    retrieve said unique identifier from the at least one device;
    request a server to obtain from the database location data corresponding to said unique identifier (UID);
    receive from the server a message indicating that the database has no location data corresponding to said unique identifier;
    request, if the database has no location data corresponding to said unique identifier a user, using the client device, to input location data corresponding to the location of the client device;
    receive the location data inputted by the user; and,
    instruct the server to generate in the database a device record, corresponding to the at least one device, the device record comprising a UID-field and a location information field, wherein the unique identifier (UID) is stored in the UID-field and the location data is stored in the location information field.

11. A client device comprising a processor and a memory to store instructions that, when executed by the processor, cause the client device to:
    scan for at least one device, the at least one device being provided with a unique identifier (UID) and having a fixed location near the client device;
    retrieve the unique identifier from the at least one device;
    request a server to obtain from a database location data corresponding to said unique identifier (UID);
    receive from the server a message indicating that the database has no location data corresponding to said unique identifier;
    request, if the database has no location data corresponding to said unique identifier a user, using the client device, to input location data corresponding to the location of the client device;
    receive the location data inputted by the user; and,
    instruct the server to generate in the database a device record, corresponding to the at least one device, the device record comprising a UID-field and a location information field, wherein the unique identifier (UID) is stored in the UID-field and the location data is stored in the location information field.

12. A client device according to claim 11, wherein the instructions, when executed by the processor, cause the client device further to:
    request a webserver to construct a map of a particular area containing all users that are currently located in an area based on user records in the database,
    receive the map; and,
    generate signals to display the map on a display unit.

13. A client device according to claim 12, wherein the instructions, when executed by the processor, cause the client device further to:
    request the webserver in response to input of a user to provide the client device with status information of a particular user from database, the status information comprises at least location data of said particular user and a map of an area comprising a location corresponding to the location data.

14. A server for maintaining location information in a database, wherein the server is configured to communicate with a client device, the server comprising a processor and a memory to store instructions that, when executed by the processor, cause the server to:
    receive and execute a request from the client device to obtain from the database location data corresponding to a unique identifier (UID), wherein the unique identifier is part of the request;
    if no location data corresponding to the unique identifier could be obtained from the database supply to the client device a message indicating that the corresponding location data could not be found;
    receive and execute a first instruction comprising the unique identifier (UID) of a stationary device and location data linked to said stationary device from the client device to generate in the database a stationary device record comprising a UID-field and a location information field, wherein the unique identifier (UID) is stored in the UID-field and location data is stored in the location information field.

15. A system for maintaining location information, the system comprises:
    a plurality of client devices;

a plurality of devices having a fixed location in a working environment and capable to communicate with a client device, wherein each of the plurality of devices comprises a unique identifier which can be communicated to the client device;

a server;

a database comprising device records and for each user of the system a user record, a device record comprising at least a unique identifier (UID) field and a location data field, a user record comprising at least a user-ID field and a location data field; and, a webserver configured to construct from the user records a map of at least a part of the flexible working environment with the location of users in said part of the flexible working environment, wherein the location of a user is indicated by a picture positioned in the map on the location corresponding to the location data of said user obtained from the user record of said user;

wherein each of the client devices comprises a processor and a memory to store instructions that, when executed by the processor, cause the client device to:

scan for at least one device, the at least one device being provided with a unique identifier (UID) and having a fixed location near the client device;

retrieve the unique identifier from the at least one device;

request a server to obtain from a database location data corresponding to said unique identifier (UID);

receive from the server a message indicating that the database has no location data corresponding to said unique identifier;

request, if the database has no location data corresponding to said unique identifier a user, using the client device, to input location data corresponding to the location of the client device;

receive the location data inputted by the user; and, instruct the server to generate in the database a device record, corresponding to the at least one device, the device record comprising a UID-field and a location information field, wherein the unique identifier (UID) is stored in the UID-field and the location data is stored in the location information field; and wherein the server is configured to communicate with client devices and comprises a processor and a memory to store instructions that, when executed by the processor, cause the server to:

receive and execute a request from a client device to obtain from the database location data corresponding to a unique identifier (UID), wherein the unique identifier is part of the request;

if no location data corresponding to the unique identifier could be obtained from the database supply to the requesting client device a message indicating that the corresponding location data could not be found;

receive and execute a first instruction comprising the unique identifier (UID) of a stationary device and location data linked to said stationary device from the client device to generate in the database a stationary device record comprising a UID-field and a location information field, wherein the unique identifier (UID) is stored in the UID-field and location data is stored in the location information field.

* * * * *

UNITED STATES PATENT AND TRADEMARK OFFICE
CERTIFICATE OF CORRECTION

| | | |
|---|---|---|
| PATENT NO. | : 9,218,363 B2 | Page 1 of 1 |
| APPLICATION NO. | : 14/359453 | |
| DATED | : December 22, 2015 | |
| INVENTOR(S) | : Zwaal | |

It is certified that error appears in the above-identified patent and that said Letters Patent is hereby corrected as shown below:

IN THE SPECIFICATION

In Column 11, Line 4, delete "unit 430." and insert -- unit 530. --, therefor.

In Column 11, Line 7, delete "unit 430" and insert -- unit 530 --, therefor.

IN THE CLAIMS

In Column 14, Line 27, in Claim 12, delete "A client" and insert -- The client --, therefor.

In Column 14, Line 35, in Claim 13, delete "A client" and insert -- The client --, therefor.

Signed and Sealed this
Twelfth Day of April, 2016

Michelle K. Lee
*Director of the United States Patent and Trademark Office*